United States Patent
Anbil Parthipan et al.

(10) Patent No.: US 9,582,264 B1
(45) Date of Patent: Feb. 28, 2017

(54) APPLICATION RATING PREDICTION FOR DEFECT RESOLUTION TO OPTIMIZE FUNCTIONALITY OF A COMPUTING DEVICE

(71) Applicant: INTERNATIONAL BUSINESS MACHINES CORPORATION, Armonk, NY (US)

(72) Inventors: Sarath C. Anbil Parthipan, Batlagundu (IN); Vijay Ekambaram, Chennai (IN); Ashish K. Mathur, Bangalore (IN); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/877,963

(22) Filed: Oct. 8, 2015

(51) Int. Cl.
*G06F 9/44* (2006.01)
*G06Q 30/00* (2012.01)
(Continued)

(52) U.S. Cl.
CPC .......... *G06F 8/65* (2013.01); *G06F 17/30312* (2013.01); *G06F 17/30528* (2013.01); *G06Q 30/0282* (2013.01); *G06Q 30/0631* (2013.01)

(58) Field of Classification Search
CPC ........ G06F 8/61; G06F 8/65; G06F 17/30312; G06F 17/30528; G06Q 30/0282; G06Q 30/0631
(Continued)

(56) References Cited

U.S. PATENT DOCUMENTS

| 8,417,713 B1* | 4/2013 | Blair-Goldensohn | G06F 17/30867 |
| | | | 705/347 |
| 8,515,828 B1* | 8/2013 | Wolf | G06Q 30/02 |
| | | | 705/26.1 |

(Continued)

OTHER PUBLICATIONS

Moghaddam, Samaneh, "Beyond Sentiment Analysis: Mining Defects and Improvements from Customer Feedback," 2015, Springer International Publishing Switzerland, p. 400-410.*
P. Mell et al., "The NIST Definition of Cloud Computing", National Institute of Standards and Technology, Information Technology Laboratory, Sep. 2011, pp. 1-7.

(Continued)

*Primary Examiner* — Qing Chen
(74) *Attorney, Agent, or Firm* — John R. Pivnichny; Law Office of Jim Boice

(57) ABSTRACT

A computer-implemented method, system, and/or computer program product improves a functionality of a computing device by optimizing improvements to an application running on the computing device. Defects in an application identified by user reviews are prioritized by one or more processors to create a representational model of user reviews. A rating improvement to the application caused by changing the application to resolve complaints represented by top-k negative review representations that are clustered within the predetermined distance from the defect representation is predicted by the processor(s). Based on the predicted rating improvement, the processor(s) apply defect solutions that correct problems described in the top-k negative review representations that are clustered within the predetermined distance from the defect representation to generate an improved version of the application, and then install the improved version of the application on the computing device to improve the functionality of the computing device.

20 Claims, 8 Drawing Sheets

(51) Int. Cl.
*G06F 9/445* (2006.01)
*G06F 17/30* (2006.01)
*G06Q 30/02* (2012.01)
*G06Q 30/06* (2012.01)

(58) Field of Classification Search
USPC .................. 717/168–178; 705/26.7, 347
See application file for complete search history.

(56) References Cited

U.S. PATENT DOCUMENTS

| | | | |
|---|---|---|---|
| 8,799,773 B2 | 8/2014 | Reis et al. | |
| 8,918,882 B2 | 12/2014 | Bettini et al. | |
| 2008/0249764 A1 | 10/2008 | Huang et al. | |
| 2014/0351079 A1* | 11/2014 | Dong | G06Q 30/0631 705/26.7 |
| 2015/0161686 A1* | 6/2015 | Williams | G06Q 30/0282 705/347 |
| 2015/0170228 A1* | 6/2015 | Wheeler | G06Q 50/01 705/319 |
| 2016/0071121 A1* | 3/2016 | Gestetner | G06Q 30/0201 705/7.32 |

OTHER PUBLICATIONS

Lokhande Prajakta Padmakar et al, / (IJCSIT) International Journal of Computer Science and Information Technologies, vol. 5 (6) , 2014, pp. 7063-7066.

Moghaddam, Samaneh. "Beyond Sentiment Analysis: Mining Defects and Improvements from Customer Feedback." Advances in Information Retrieval. vol. 0302-9743. Springer International, 2015. 400-410.

S. Matalonga, T S. Feliu, V. Rus. "Automatic Defect Classification: An Experience Applying Natural Language Processing." Dunn Hall, Memphis TN. Department of Computer Science, University of Memphi.(2011) http://fi.ort.edu.uy/innovaportal/file/2038/1/automaticdefectclasification.pdf.

Iacob, Claudia, and Rachel Harrison. "Retrieving and Analyzing Mobile Apps Feature Requests from Online Reviews." IEEE. MSR '13 Proceedings of the 10th Working Conference on Mining Software Repositories (2013): 41-44.

Chen, Ning, Jialiu Lin, Steven C. H. Hoi, Xiaokui Xiao, and Boshen Zhang. "AR-Miner: Mining Informative Reviews for Developers from Mobile App Marketplace." ICSE '14 (2014). http://research.larc.smu.edu.sg/mlg/papers/IICSE14_ARminer.pdf.

\* cited by examiner

APPLICATION RATING PREDICTION FOR DEFECT RESOLUTION TO OPTIMIZE FUNCTIONALITY OF A COMPUTING DEVICE

BACKGROUND

The present disclosure relates to the field of computing device, and specifically to the field of computing devices that run mobile applications. Still more specifically, the present disclosure related to predicting the effect of changes to mobile applications on future user reviews.

SUMMARY

A computer-implemented method, system, and/or computer program product improves a functionality of a computing device by optimizing improvements to an application running on the computing device. A representational model of user reviews of an application is created by prioritizing defects in an application identified by the user reviews, where the representational model is trained and created exclusively with the user reviews of the application, and wherein said representational model is created by one or more processors that: receive user reviews of the application, which include initial ratings of the application; classify the user reviews according to a sentiment of the user reviews to identify negative reviews and positive reviews; classify the negative reviews into a review type selected from functionality, performance and usability of the application; tag each of the negative reviews with the review type; plot the negative user reviews as negative user review representations in an n-dimensional space, where the negative user review representations are plotted according to the sentiment of the user, the review type, and a contextual content of the negative user reviews; cluster top-k negative review representations from the negative review representations; plot a defect in the application as a defect representation in the n-dimensional space; represent vectors from the defect representation to the top-k negative review representations in the n-dimensional space, where the vectors represent a degree of overlap of contextual descriptors of the defect and user complaints found in the negative user reviews; determine Euclidian distances from the defect representation to the top-k negative review representations in the n-dimensional space according to the vectors; identify the negative user review representations that are clustered within a predetermined distance from the defect representation according to the Euclidian distances; and prioritize the defect according to the negative user review representations that are clustered within the predetermined distance from the defect representation according to the Euclidian distances.

A rating improvement to the application caused by changing the application to resolve complaints represented by the top-k negative review representations that are clustered within the predetermined distance from the defect representation is predicted by the processor(s) utilizing the representational model. The changes that resolve complaints that are represented by the top-k negative review representations that are clustered within the predetermined distance from the defect representation are predicted to result in a greater improvement to future user reviews of the application than changes that are represented by negative review representations that are plotted outside the predetermined distance from the defect representation. Based on the predicted rating improvement, the processor(s) apply defect solutions that correct problems described in the top-k negative review representations that are clustered within the predetermined distance from the defect representation to generate an improved version of the application. The processor(s) then install the improved version of the application on the computing device to improve the functionality of the computing device.

DETAILED DESCRIPTION

Figure 1:
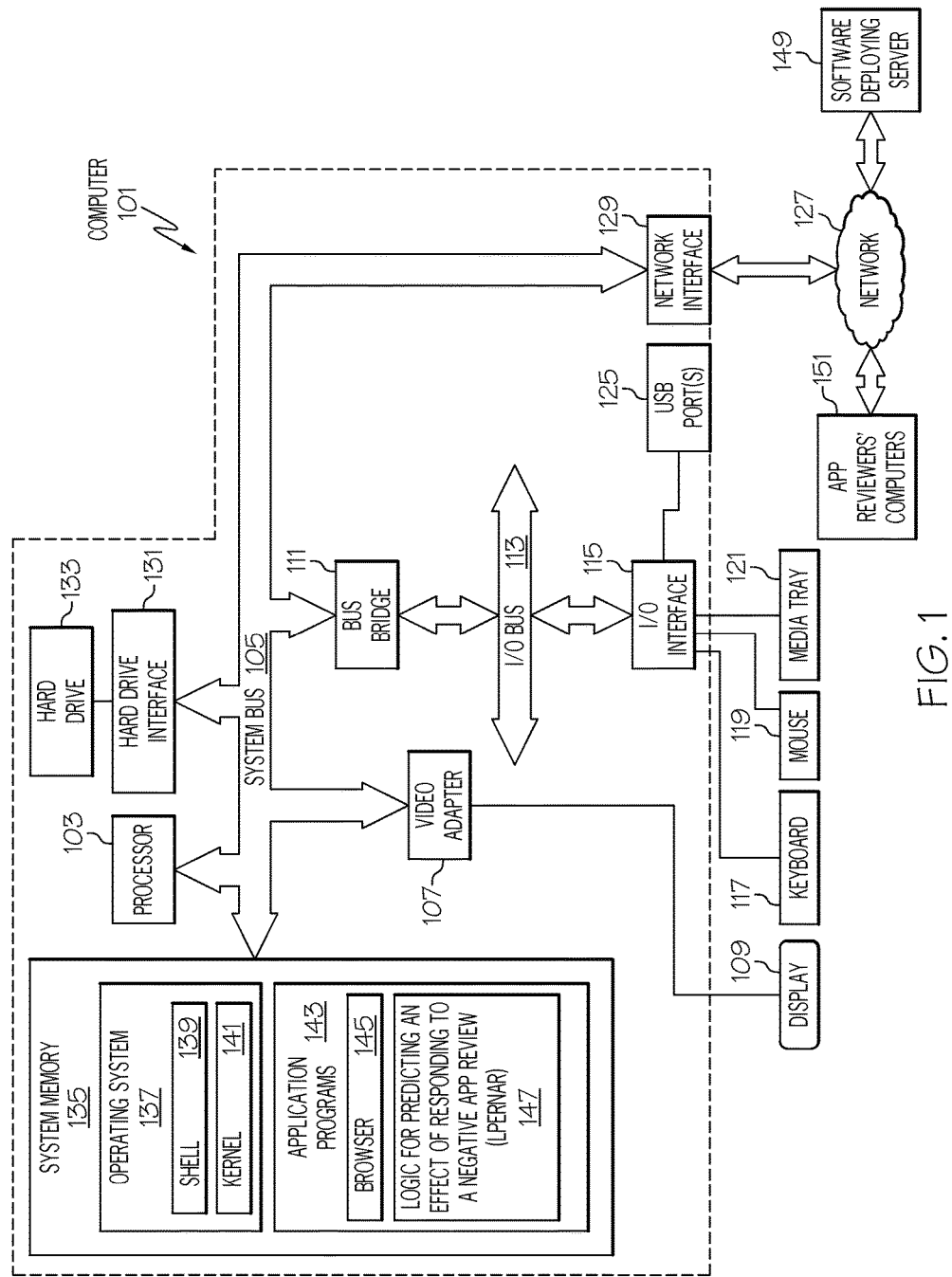
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Product provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or app reviewers' computers 151.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., app reviewers' computers 151) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Predicting an Effect of Responding to a Negative App Review (LPERNAR) 147. LPERNAR 147 includes code for implementing the processes described below, including those described in FIGS. 2-5. In one embodiment, computer 101 is able to download LPERNAR 147 from software deploying server 149, including in an on-demand basis, wherein the code in LPERNAR 147 is not downloaded until needed for execution. In one embodiment of the present invention, software deploying server 149 performs all of the functions associated with the present invention (including execution of LPERNAR 147), thus freeing computer 101 from having to use its own internal computing resources to execute LPERNAR 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

When an application is tested, not all defects in the application get identified. Furthermore, mobile app (short for a computer application that runs on a mobile device such as a smart phone) testing is highly dependent on various real-time contexts, such that it is not practically feasible to emulate all of the realistic contexts within a laboratory setting.

Therefore, many application defects get revealed after the application is released and reviewed on-line, such as in the comments/feedback section of an on-line app store. Currently, these reviews are required to be manually evaluated by the app developer, in order to determine the problem being addressed in the critique, their criticality level, etc.

Thus, the present invention presents a deep learning approach that automatically identifies defect (i.e., the type of defect, the defect description, the defect criticality, etc.) from user reviews.

As described herein, the present invention, identifies the top-k defects (i.e., the most frequently reported defects) from the reviews, prioritizes these top-k defects, and then for each defect detected, establishes the defect description for each of the top-k defects, the type of defects presented in the top-K defects, and the criticality of the defects described in the top-k defects.

Figure 2:
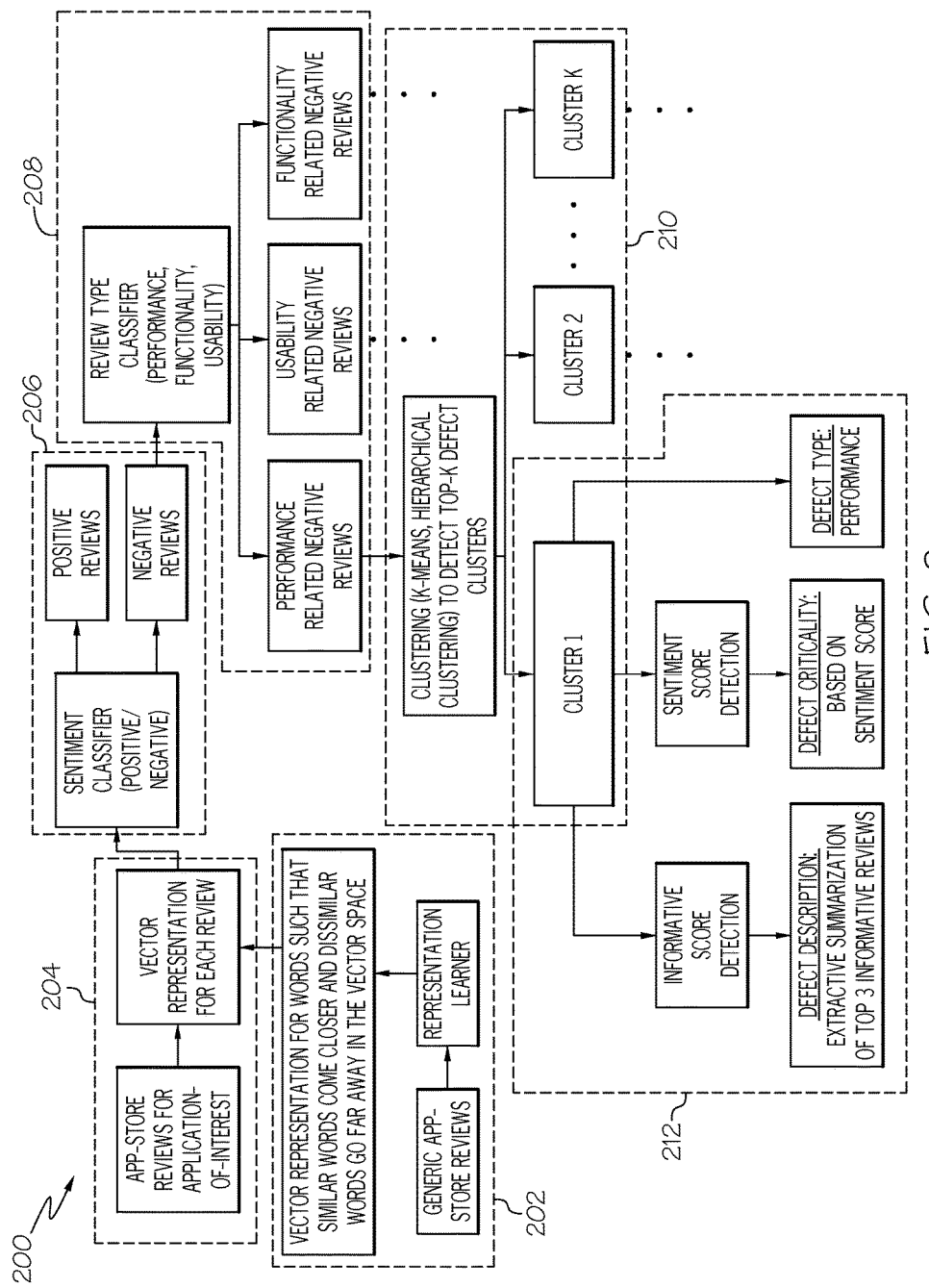
FIG. 2 illustrates a process for identifying and prioritizing defect solutions to defects in an application.

With reference now to FIG. 2, a process 200 for identifying and prioritizing defect solutions to defects in an application through the use of a deep learning approach is presented.

As represented in block 202, Step 1 of process 200 is to perform unsupervised representation learning about reviews from a generic app-store (i.e., an on-line store that provides apps to consumers and publishes reviews about the apps from the consumers).

As shown in block 202, a representation learner (i.e., heuristic logic that is able to evaluate user reviews) receives the generic app-store reviews. The representation learner then outputs a vector representation for words found in the app-store reviews, such that similar words come closer and dissimilar words go farther apart in a vector space.

The representation learner is based on a neural probabilistic language model (NPLM), which understands the context of words in an app review. However, the present invention takes this understanding further, and plots the context of the words in a multidimensional spade (i.e., N-d space). As described herein, similar words get plotted closer together in the N-d space, where N is the vector size of the word representation.

For example, consider the words "Test-case" and "Test-script". These two words lie very close together in N-d space. Similarly, the word "testing" is close to both "Test-case" and "Test-script" in the N-d space, although "Test-case" and "Test-script" are closer to each other than to "testing".

Since the input to the representation learner in block 202 is the play store reviews, the present invention is able to capture words used in the reviews from the play store reviews, and finds a correlation between them. The model described herein becomes more and more accurate as more reviews are input to the representation learner, since more data points means better correlations/information.

As shown in block 204 in FIG. 2, Step 2 of process 200 is representing user reviews as vectors. Each review is represented as a vector, which is computed from the vector representations of words in the user reviews. In one embodiment, the reviews are evaluated using a term frequency-inverse document frequency (tf-idf). The tf-idf value increases proportionally to the number of times a word appears in a user review, but is offset (decreases) by the excess frequency that the word appears in the review, thus compensating for common and yet insignificant words such as "the", "a", etc.

Thus, an exemplary vector for a review may be (1.2, −3.4, 0.3), where "1.2" represents a first facet of the review (e.g., a first keyword related to a first defect in the app), "−3.4" represents a second facet of the review (e.g., a second keyword related to a second defect in the app), and "0.3" represents a third facet of the review (e.g., a sentiment of the review).

Figure 3:
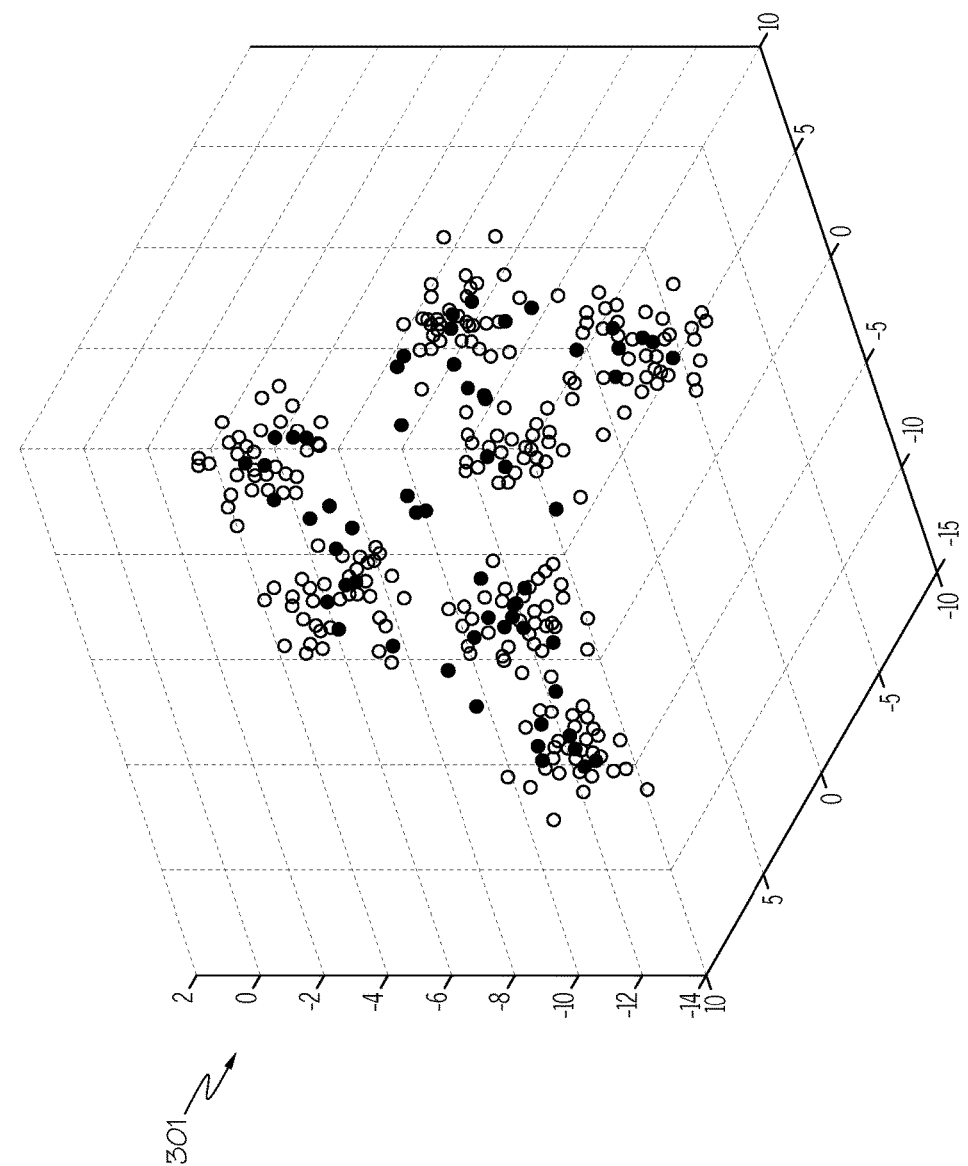
FIG. 3 depicts clusters of app reviews plotted in 3-dimensional space.

As shown in block 206 in FIG. 3, Step 3 of process 200 is classifying reviews based on their sentiment (i.e., positive or negative). A positive review has praise for an app, and a negative review has complaints about an app.

In Step 3-A, the sentiment classifier is trained to recognize positive versus negative reviews, such as recognizing certain keywords (e.g., awful, bad, disappointing, etc.) for negative reviews and other keywords (e.g., great, useful, valuable, etc.) for positive reviews.

In Step 3-B, the app reviews are classified into positive and negative reviews using the trained sentiment classifier.

In Step 3-A (training the sentiment classifier), a set of labeled reviews from a play-store is used as inputs. Reviews can be labeled manually or labeled based on their ratings (e.g., "5" for the best and "1" for the worst). Outputs from the sentiment classifier are predictions as to whether the user reviews are positive or negative.

For example, all of the reviews in training data are represented as vectors. Thereafter, the binary sentiment classifier (for classifying the user reviews as positive or negative) uses the representation of the training data reviews as being either positive or negative. Since the representation captures the context information, sentiment is detected based on context and not only based on keywords. That is, even if a negative word appears in a positive context, the sentiment classifier will still classify the user rating as being positive. For example, assume that the review says "This app is the bomb". Based on the overall context of the phrase, this is very different than a review that says "This app is a bomb". That is, the sentiment classifier is aware of idiomatic expressions that mean something positive (e.g., "This is the bomb", meaning that the app is great), as opposed to a review that is negative (e.g., "This is a bomb", meaning it is a failure).

In Step 3-B, app reviews are classified as either positive or negative. The input used in this step is the trained model developed in Step 3-A along with app reviews for the application of interest, and the output of this step is the classification of the app reviews as being either positive or negative.

As depicted in block 208 in FIG. 2, Step 4 of process 200 is classifying negative reviews into different types of reviews, such as reviews direction to the functionality of the app, the performance of the app, the usability of the app, etc. Step 4-A trains a classifier to classify negative reviews into one or more of these review types, and Step 4-B tags each review with its associated type.

Thus, in Step 4-A, the classifier is trained to tag reviews. The inputs used in this step is a set of labeled negative reviews, and the output from this step is a model which, given a review, can predict scores for each tag. Thus, in Step 4-A, all reviews in the training data are represented as vectors. Using this vector representation, the classifier is trained to predict scores/probabilities for each associated tag. Note that each review can have multiple tags (i.e., same review can talk about functional aspects as well as performance aspects of a same app).

In Step 4-B, the input is the trained model developed in step 4-A as well as negative user reviews of an application-of-interest, and the output is tags for each review, such that each review is tagged as performance and/or functionality and/or usability. Thus, in Step 4-B, the reviews of the application-of-interest are represented in the vector form generated in Step 1. Using each review, the trained model from Step 4-A is used to obtain scores for all possible tags. Next, tags with the highest confidence are selected. In one embodiment, a same review can have multiple highest confidence tags (e.g., all having a same high level of confidence).

As depicted in block 210 in FIG. 2, Step 5 of process 200 clusters reviews.

An input to Step 5 is a set of negative reviews for a particular type of review retrieved from Step 4-B according to a k-value (i.e., a determined number of defects that are detected), and the output are the top-k clusters of reviews, where each cluster conceptually talks about some common negative point about an application.

Thus, in Step 5, the negative reviews are represented as a particular type of vector form using the process described in Step 1. These negative reviews are clustered in vector space (e.g., as depicted in 3-D graph 301 in FIG. 3) using k-means or hierarchical clustering. The top-k clusters are selected and prioritized based on various features, such as average rating in the cluster, cluster density, average negative aspect in the cluster, etc. This clustering produces and/or identifies a group of reviews that talk about a common negative point (in an unsupervised way). Since reviews are represented as vectors in N-d space using an unsupervised representation learning model (as described in Step 1 and Step 2) that captures the semantic context rather than just syntax, reviews that conceptually talk about some common point appear closer in N-d space. Thus, a summary of each cluster would be a defect in the app.

As depicted in block 212 in FIG. 2, Step 6 of process 200 generates details of defects in the app. The input to Step 6 is a set of reviews in a given defect cluster derived from Step 5, and the output is a defect description, a defect criticality, and a type of defect.

Step 6-A of Step 6 is to create the defect description. For each review in a cluster, a calculation is made to determine how informative/useful the user review is. For example, a review of an app that only states that "This app is awesome" or "This app is awful" demonstrates strong sentiments, but does not provide any useful information regarding what is good or bad about the app. On the other hand, a user review that says "This app crashes whenever it runs while another app is running on my phone" is extremely informative. Thus, a simple binary classifier is trained to classify each sentence in the review as being informative or not, using heuristic contextual interpretation of the sentence (e.g., using keywords, word context, etc.). An informative score of the review, which is a normalized count of the number of informative lines in the review, is then generated. Based on this informative score, the top-n (e.g., the top 3) reviews are selected. An extractive summarization technique is then applied to these top 3 reviews to obtain a summary of the defect description.

Step 6-B of Step 6 establishes a defect criticality value for the defect. Thus, for each review in the defect cluster, a sentiment score is calculated using a sentiment classifier (similar to that used in Step 3-A). Sentiment score ranges from 0-1, with 1 being most negative. A weighted combination of (1) the review level information (i.e., based on the sentiment score and the rating of the app) and (2) the cluster level information (i.e., the number of reviews in the cluster), the defect criticality is then computed.

Step 6-C of Step 6 establishes a defect type for the defect. The defect type is identified by the type of reviews in the defect cluster (derived in Step 4). Each defect is then tagged as being a performance defect, a functionality defect, and/or a usability defect.

Thus, as depicted in FIG. 2, a deep learning based approach analyzes app store reviews related to the application-of-interest to semantically identify top-k defects, prioritize top-k defects, classify top-k defects and also provide defect summarization for each identified defect using the following exemplary steps.

Once the user reviews are plotted as described in FIGS. 2-3, these reviews are used to predict how much improvement to future user reviews can be expected when the defects identified in the earlier reviews are resolved.

As described below, the present invention presents a mechanism that predicts (with great accuracy) the value/rating/behavior of end-users for each issue, if resolved. This allows developers to know that, by resolving Issue X, the total app rating will increase by Y %. Based on the value of Y, developers can then decide whether or not they need to resolve issue X.

Thus, the present invention, given a defect description for an application, predicts and estimates the percentage of user rating improvement that will be obtained for the application-of-interest if an identified defect is resolved in next revisions. The present invention further prioritizes defects based on the predicted percentage of rating improvements for each application-of-interest. To achieve this, the present invention uses a deep learning solution in which, given a defect description (e.g., in English text), the present system identifies all the reviews related to the application-of-interest that criticize this defect. Ratings given by various users who posted the criticized reviews (about the defect) are then identified. If this defect had been rectified, then a user would have given a better rating to that application. As such, the present invention presents a method that will predict a new rating for each user who has posted a criticized review, with consideration given to various factors such as sentiments in the review, harshness of words, coupling with the defect, etc.

Based on the predicted new ratings for each user (who criticized the defect), an overall new rating of the application is then predicted. The new predicted overall rating is compared with the current overall rating, and a percentage of rating improvement that would be obtained by rectifying the defect is predicted. Based on this percentage rating improvement, defects are prioritized.

For example, consider an app for a camera on a smart phone that has the defect of taking a very long time to open a camera feature when the user clicks an "open camera" button. A first review may state "This app is awful! It took a very long time to open the camera. Rating: 2.". A second review may state "I tried to click an image from this app and the app hangs a while. In fact my phone too gets hanged. I uninstalled the app immediately. Rating: 1."

Contextually, the first review and the second review talk about the same defect, even though they share few common keywords other than app. In the present invention, deep learning is used to identify the fact that these two reviews are addressed to the same problem with the app. In order to achieve this, a four-step process is now presented.

Step 1: Unsupervised Representation Learning

In Step 1, a collection of all app reviews from an app store are used as inputs, and a vector representation for words is outputted such that similar words come closer and dissimilar words are farther apart in vector space.

Figure 4:
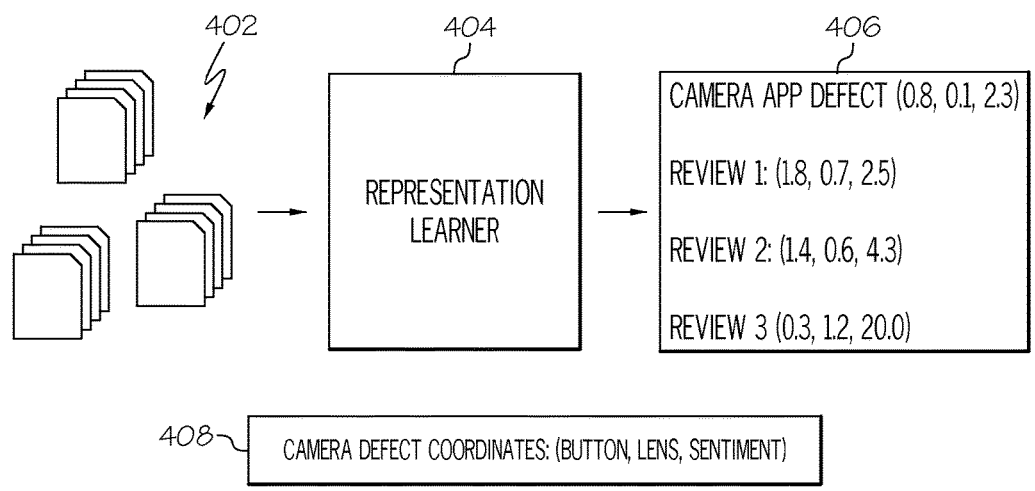
FIG. 4 depicts a representation learner converting user reviews of applications into plot coordinates.

For example, consider FIG. 4, in which user reviews 402 are input into a representation learner 404 (similar to the representation learner described in block 202 in FIG. 2), which outputs vectors 406 that describe the defect and the content of the user reviews.

For example, assume that a 3-D vector is generated for content related to a camera button in the X-axis, the camera lens in the Y-axis, and a sentiment of the review/problem in the Z-axis, as depicted in block 408. Thus, the 3-D vector values for the problem with the app (i.e., a camera app defect) is plotted at 0.8, 0.1, and 2.3 for the respective elements button, lens, sentiment. Similarly, Review 1 has the 3-D vector values of 1.8, 0.7, and 2.5 for the respective elements button, lens, sentiment; Review 2 has the 3-D vector values of 1.4, 0.6, and 4.3 for the respective elements button, lens, sentiment; and Review 3 has the 3-D vector values of 0.3, 1.2, and 20.0 for the respective elements button, lens, sentiment.

Figure 5:
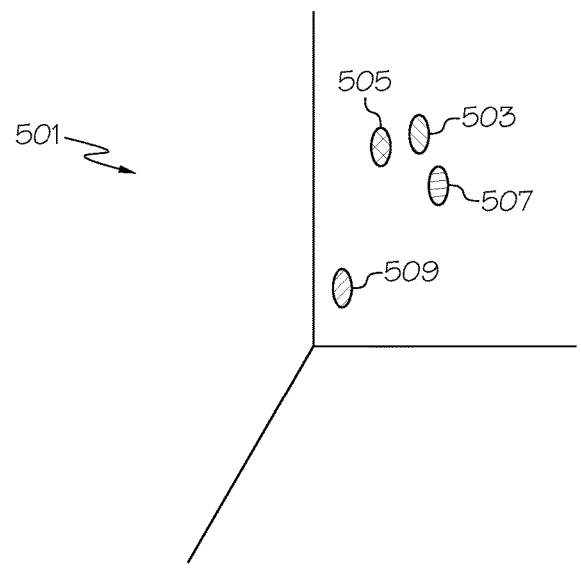
FIG. 5 illustrates a three-dimensional graph of negative reviews of an application.

These values are then plotted on a 3-D graph, such as the graph 501 shown in FIG. 5. The graph element representation 503 is for the camera app defect; the graph element representation 505 is for Review 1; the graph element representation 507 is for Review 2 and the graph element representation 509 is for Review 3. Note that graph element representation 505 and graph element representation 507 are close to graph element representation 503. Thus, Review 1 and Review 2 are germane to the camera app defect. However, graph element representation 509 is far from the graph element representation 503, and thus is not germane to the camera app defect (either because it does not address the defect, has high praise for the application, etc.).

Returning to FIG. 4, the representation learner 404 is based on the neural probabilistic language model discussed above. This technique understands the context of words and plots them in N-d space. Using this technique, similar words gets plotted closer in N-d space, where N is the vector size of the word representation.

Step 2: Representing Reviews

In Step 2, each review is represented as a vector that is computed from the vector representations of the words in the review, preferably using the term frequency-inverse document frequency (tf-idf) analysis described above with FIG. 2. This results in a defect/review vector in some n-dimensional real vector representation (e.g., as shown in block 406 in FIG. 4)

Step 3: Relevant Reviews for a Defect

In Step 3, the defect description and all reviews are represented in n-dimensional space using the vector representation described above. The Euclidean distances between the reviews and the defect description are then found, and the reviews are sorted based on the decreasing Euclidean distance (i.e., each review that is plotted closer to the defect is ranked higher). The top-k reviews are selected and their corresponding importance is determined by their Euclidean distance to the defect, as depicted in FIG. 5.

Step 4: Predicting Rating Improvement

Assume that the two reviews represented by graph element representation 505 and graph element representation 507 are ranked as being the most relevant to the defect represented by graph element representation 503 in FIG. 5 due to their close Euclidian distance. A rating improvement for each review, if the defect is rectified, is inversely proportional to the Euclidean distance and directly proportional to the negative sentiment in the review. That is, the predicted improvement to future reviews is based on (1) how close the graph element representation 505 and the graph element representation 507 are to the graph element representation 503 for the defect (inversely proportional to the Euclidean distance), assuming that the problems addressed by the user reviews represented by graph element representations 505/507 are resolved, and (2) how vehement the reviewer is in his complaint about the defect (directly proportional to the negative sentiment in the review).

Based on these elements, the sentiment of future user reviews can be predicted. That is, a prediction is now made as to whether user reviews will improve (in which the users like the new version of the app more than the previous version) or decline (in which the users like the new version of the app less than the previous version).

Figure 6:
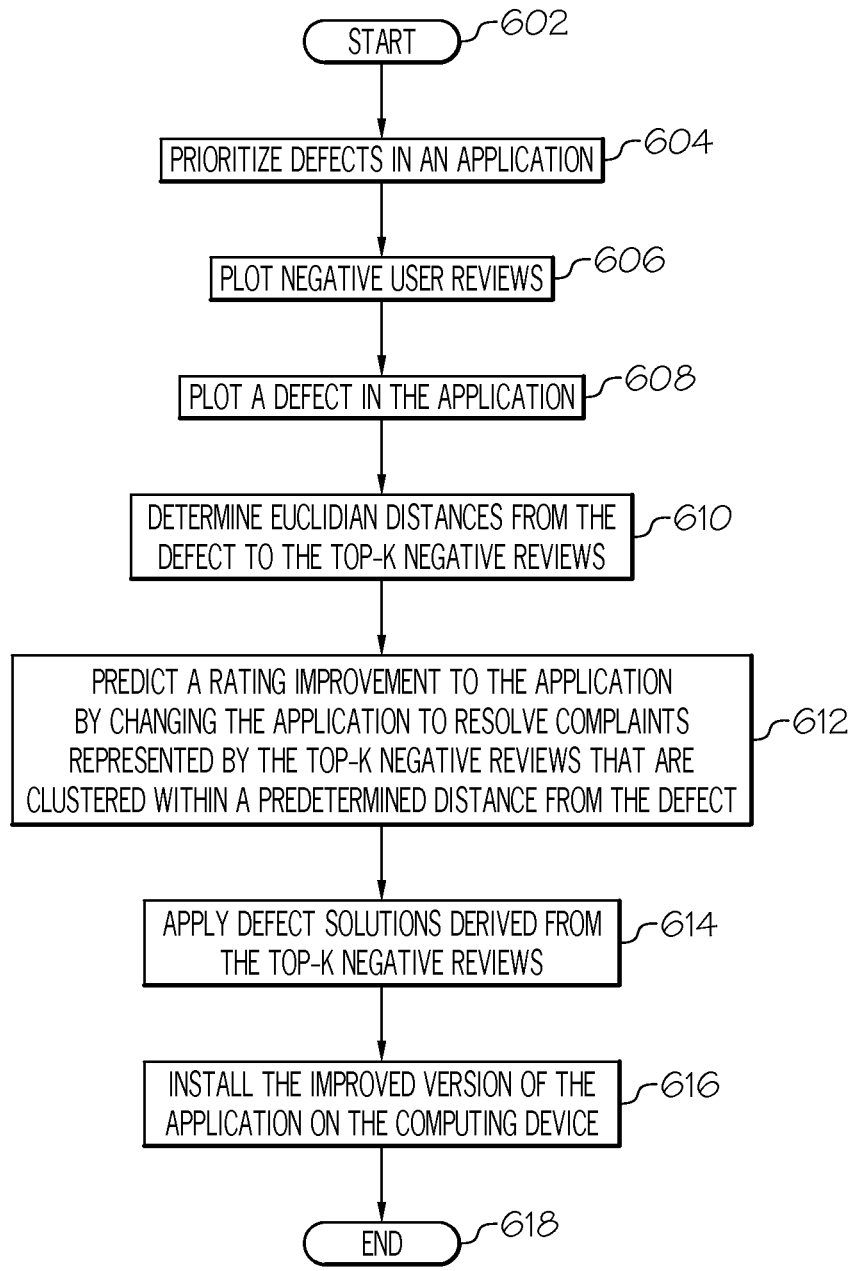
FIG. 6 is a high-level flow chart of one or more steps performed by one or more processors and/or other hardware to improve a functionality of a computing device by optimizing improvements to an application running on the computing device.

With reference now to FIG. 6, a high-level flow chart of one or more steps performed by one or more processors and/or other hardware to improve a functionality of a computing device by optimizing improvements to an application running on the computing device is presented.

After initiator block 602, one or more processors prioritize defects in an application identified by user reviews, as described in block 604.

The processor(s) receive user reviews of the application, where the user reviews include initial ratings of the application, and then classify the user reviews according to a sentiment of the user reviews to identify negative reviews and positive reviews.

The processor(s) classify the negative reviews into a review type. The review type may be a functionality type, a performance type, or a usability type of negative review about the application, and tag each of the negative reviews with the review type.

As described in block 606, the processor(s) plot the negative user reviews as negative user review representations in an n-dimensional space. The negative user review representations are plotted according to the sentiment of the user, the review type, and a contextual content of the negative user reviews. The processor(s) then cluster top-k negative review representations from the negative review representations.

As described in block 608, the processor(s) plot a defect in the application as a defect representation in the n-dimensional space, and then represent vectors from the defect representation to the top-k negative review representations in the n-dimensional space. These vectors represent a degree of overlap of contextual descriptors of the defect and user complaints found in the negative user reviews. That is, the closer the two representations on the n-dimensional space graph are, the more similar they are.

As described in block 610, the processor(s) determine the Euclidian distances from the defect representation to the top-k negative review representations in the n-dimensional space according to the vectors. The processor(s) then identify the negative user review representations that are clustered within a predetermined distance from the defect representation according to the Euclidian distances, and then prioritize the defect according to the negative user review representations that are clustered within the predetermined distance from the defect representation according to the Euclidian distances.

As described in block 612, the processor(s) predict a rating improvement to the application by changing the application to resolve complaints represented by the top-k negative review representations that are clustered within the predetermined distance from the defect representation. Changes that resolve complaints that are represented by the top-k negative review representations that are clustered within the predetermined distance from the defect representation are predicted to result in a greater improvement to future user reviews of the application than changes that are represented by negative review representations that are plotted outside the predetermined distance from the defect representation.

As described in block 614, the processor(s) then, based on the predicted rating improvement, apply defect solutions that correct problems described in the top-k negative review representations that are clustered within the predetermined distance from the defect representation to generate an improved version of the application.

As described in block 616, the processor(s) then install the improved version of the application on the computing device, in order to improve the functionality of the computing device.

The flow chart ends at terminator block 618.

In one embodiment of the present invention, the processor(s) prioritize installation of the defect solutions according to the review type of the negative reviews. That is, a functionality type of review may be responded to with a solution before responding with a different solution to a performance type of review, which may be responded to with a solution before responding with an even different solution to a usability type of review.

In one embodiment of the present invention, the processor(s) prioritize installation of the defect solutions according to the sentiment of the user reviews. That is, negative reviews are addressed before positive reviews. Likewise, more negative reviews are addressed before less negative reviews with appropriate solutions that address the more negative reviews.

In one embodiment of the present invention, the processor(s) compute defect criticalities of the defects according to a sentiment score, a rating, and a number of user reviews that address different defects in the application, and then prioritize the defect solutions according to the defect criticalities. Thus, the most negative reviews with the lowest rating that are submitted by the highest number of negative reviewers will have the problem presented in these negative reviews addressed and solved before other problems in other reviews.

In one embodiment of the present invention, the processor(s) generate multiple improved versions of the application, identify an optimal improved version of the application that has a higher rating improvement than other improved versions of the application (where the optimal improved version of the application is from the multiple improved versions of the application), and then install the optimal improved version of the application before installing the other improved versions of the application on the computing device. That is, the best improvement of the app is installed on the computing device.

In one embodiment of the present invention, the processor(s), in response to installing the improved version of the application on the computing device, retrieve new user reviews of the application, wherein the new user reviews comprise new ratings of the application. Then, in response to detecting an improvement in the new ratings over the initial ratings, the processor(s) apply the defect solutions that correct the problems described in the top-k negative review representations that are clustered within the predetermined distance from the defect representation to a subsequent version of the application that is released after the improved version of the application. The processor(s) then install the subsequent version of the application on the computing device. That is, if the solutions work, then they are kept.

However, if the solutions do not improve the functionality of the app and the computing device, then they are discarded. That is, in response to installing the improved version of the application on the computing device, the processor(s) retrieve new user reviews of the application, wherein the new user reviews comprise new ratings of the application. In response to detecting a decline in the new ratings over the initial ratings, the processor(s) remove the defect solutions from a subsequent version of the application that is released after the improved version of the application, and then install the subsequent version of the application (with the defect solutions removed) on the computing device.

Thus, in one or more embodiments described herein, the present invention presents three main steps.

Step 1: Train a representation model using only app-store reviews such that similar words having the same semantics and domain context (e.g., are all related to mobile applications, and thus have the same Mobile Application domain context) have neural embedding representations that have the least amount of Euclidean space among them. (See FIG. 4.)

Step 2: Use the trained model from Step 1 and a tf-idf analysis (see block 204 in FIG. 2) to generate neural embedding representations for reviews such that two reviews, which semantically and contextually discuss a same topic, have neural embedding representations that have the least amount of Euclidean space among them. (See FIG. 5.)

Step 3. After performing Step 1 and Step 2, the present invention only needs to work with the neural embedding representations obtained from Step 2, and does not consider the English text of reviews. Thus, from Step 3 onwards, the present invention uses the neural embedding representations obtained in Step 2 to discover defects and do rating prediction. (See FIG. 2 and FIG. 6.)

Thus, in one or more embodiments the present invention derives semantic representations for app-store reviews and then uses these semantic representations for detecting defects and performing rating predictions as described herein. Since the classifiers and clustering techniques described herein work with semantic representations rather than human language text (which is noisy and doesn't capture semantics), the present invention more effectively detects defects, thus improving the performance of the computer on which the applications (apps) are running.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
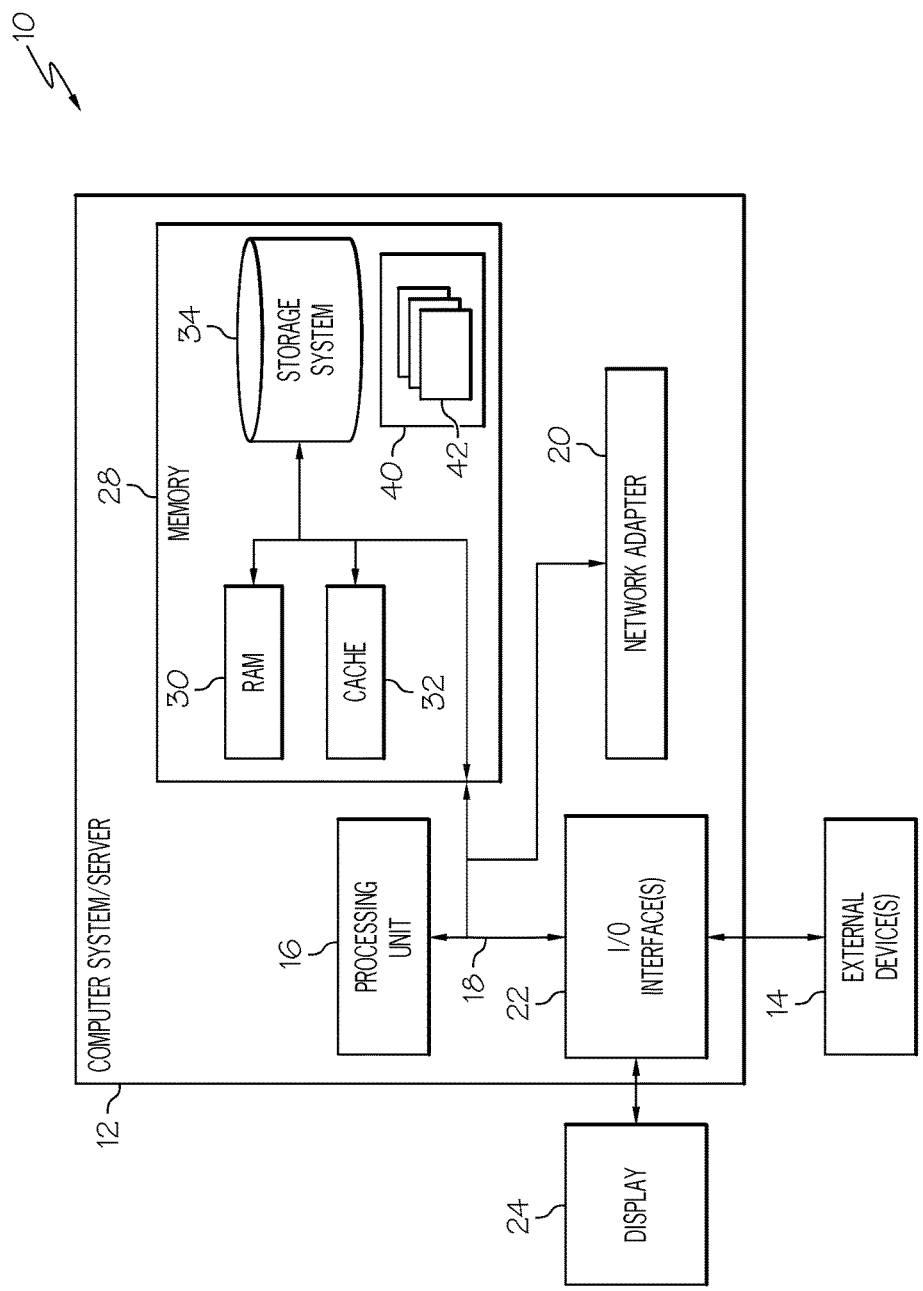
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
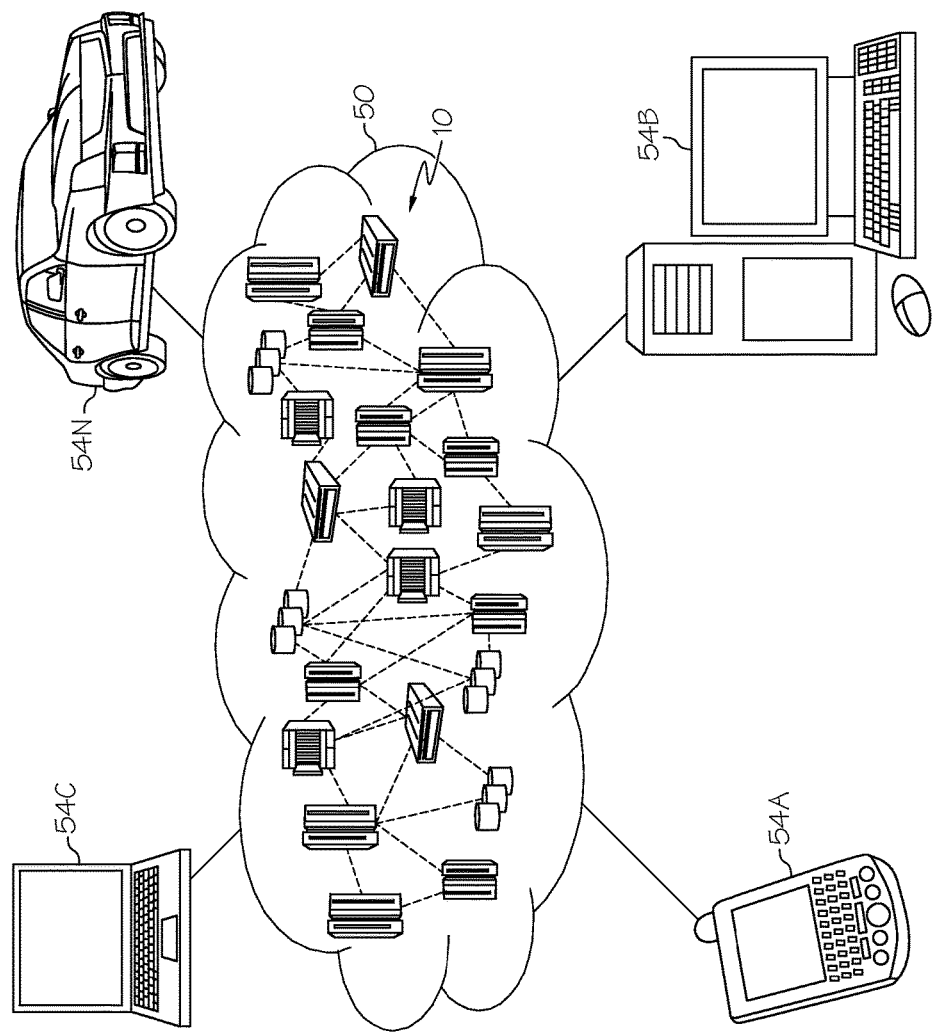
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 7 are intended to be illustrative only and that computing nodes 10 and cloud computing environment 50 can communicate with any type of computerized device over any type of network and/or network addressable connection (e.g., using a web browser).

Figure 9:
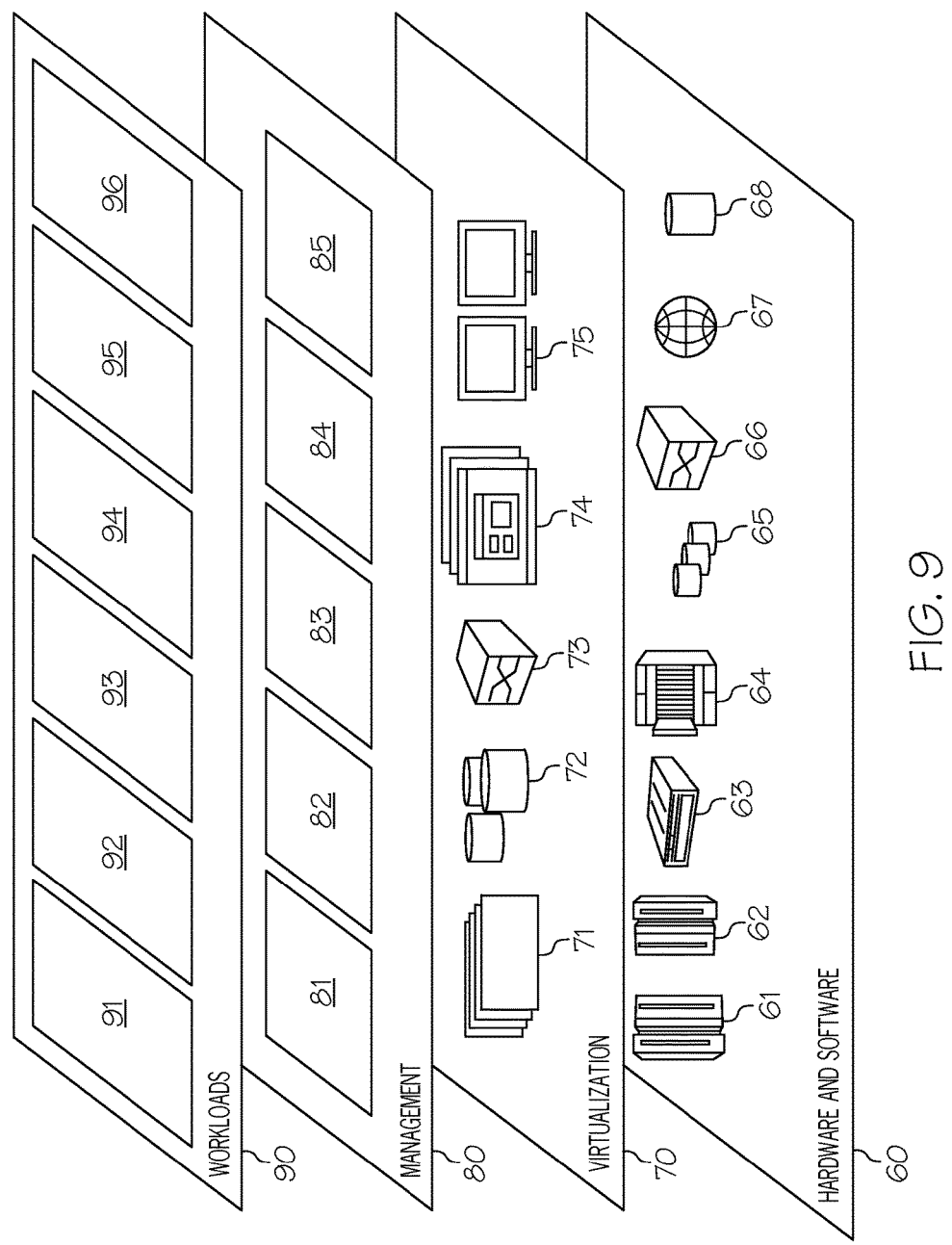
FIG. 9 depicts abstraction model layers according to an embodiment of the present disclosure.

Referring now to FIG. 9, a set of functional abstraction layers provided by cloud computing environment 50 (FIG.

8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and app rating prediction processing 96 (for predicting the rating of a future version of an app (application) to improve the functionality of a computing device that runs the app as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for improving a functionality of a computing device by optimizing improvements to an application running on the computing device, the computer-implemented method comprising:

creating, by one or more processors, a representational model of user reviews of an application by prioritizing defects in the application identified by the user reviews, wherein the representational model is trained and created exclusively with the user reviews of the application, and wherein the representational model is created by:

receiving, by one or more processors, user reviews of the application, wherein the user reviews comprise initial ratings of the application;

classifying, by one or more processors, the user reviews according to a sentiment of the user reviews to identify negative user reviews and positive user reviews;

classifying, by one or more processors, the negative user reviews into a review type selected from a group of review types consisting of a functionality type of review of the application, a performance type of review of the application, and a usability type of review of the application;

tagging, by one or more processors, each of the negative user reviews with the review type;

plotting, by one or more processors, the negative user reviews as negative user review representations in an n-dimensional space, wherein the negative user review representations are plotted according to the sentiment of the user reviews, the review type, and a contextual content of the negative user reviews;

clustering, by one or more processors, top-k negative user review representations from the negative user review representations;

plotting, by one or more processors, a defect in the application as a defect representation in the n-dimensional space;

representing, by one or more processors, vectors from the defect representation to the top-k negative user review representations in the n-dimensional space, wherein the vectors represent a degree of overlap of contextual descriptors of the defect in the application and user complaints found in the negative user reviews;

determining, by one or more processors, Euclidian distances from the defect representation to the top-k negative user review representations in the n-dimensional space according to the vectors;

identifying, by one or more processors, the negative user review representations that are clustered within a predetermined distance from the defect representation according to the Euclidian distances; and prioritizing, by one or more processors, the defect in the application according to the negative user review representations that are clustered within the predetermined distance from the defect representation according to the Euclidian distances;

utilizing the representational model to predict, by one or more processors, a rating improvement to the application caused by changing the application to resolve user complaints represented by the top-k negative user review representations that are clustered within the predetermined distance from the defect representation according to the Euclidian distances, wherein changes that resolve user complaints that are represented by the top-k negative user review representations that are clustered within the predetermined distance from the defect representation according to the Euclidian distances are predicted to result in an improvement to future user reviews of the application than changes that are represented by negative user review representations that are plotted outside the predetermined distance from the defect representation according to the Euclidian distances;

based on the predicted rating improvement to the application, applying, by one or more processors, defect solutions that correct problems described in the top-k negative user review representations that are clustered within the predetermined distance from the defect representation according to the Euclidian distances to generate an improved version of the application; and installing, by one or more processors, the improved version of the application on the computing device to improve the functionality of the computing device.

2. The computer-implemented method of claim 1, further comprising:
prioritizing, by one or more processors, installation of the defect solutions according to the review type of the negative user reviews.

3. The computer-implemented method of claim 1, further comprising:
prioritizing, by one or more processors, installation of the defect solutions according to the sentiment of the user reviews.

4. The computer-implemented method of claim 1, further comprising:
computing, by one or more processors, defect criticalities of the defects according to a sentiment score, a rating, and a number of user reviews that address different defects in the application; and
prioritizing, by one or more processors, the defect solutions according to the defect criticalities of the defects.

5. The computer-implemented method of claim 1, further comprising:
generating, by one or more processors, multiple improved versions of the application;

identifying, by one or more processors, an optimal improved version of the application that has a higher rating improvement than other improved versions of the application, wherein the optimal improved version of the application is selected from the multiple improved versions of the application; and installing, by one or more processors, the optimal improved version of the application before installing the other improved versions of the application on the computing device.

6. The computer-implemented method of claim 5, further comprising:
in response to installing the optimal improved version of the application before installing the other improved versions of the application on the computing device, retrieving, by one or more processors, new user reviews of the application, wherein the new user reviews comprise new ratings of the application;
in response to detecting an improvement in the new ratings of the application over the initial ratings of the application, applying, by one or more processors, the defect solutions that correct the problems described in the top-k negative user review representations that are clustered within the predetermined distance from the defect representation according to the Euclidian distances to a subsequent version of the application that is released after the optimal improved version of the application; and
installing, by one or more processors, the subsequent version of the application on the computing device.

7. The computer-implemented method of claim 5, further comprising:
in response to installing the optimal improved version of the application before installing the other improved versions of the application on the computing device, retrieving, by one or more processors, new user reviews of the application, wherein the new user reviews comprise new ratings of the application;
in response to detecting a decline in the new ratings of the application over the initial ratings of the application, removing, by one or more processors, the defect solutions from a subsequent version of the application that is released after the optimal improved version of the application; and
installing, by one or more processors, the subsequent version of the application on the computing device.

8. A computer program product for improving a functionality of a computing device by optimizing improvements to an application running on the computing device, the computer program product comprising a non-transitory computer readable storage medium having program code embodied therewith, the program code readable and executable by a processor to perform a method comprising:
creating a representational model of user reviews of an application by prioritizing defects in the application identified by the user reviews, wherein the representational model is trained and created exclusively with the user reviews of the application, and wherein the representational model is created by:
receiving user reviews of the application, wherein the user reviews comprise initial ratings of the application;
classifying the user reviews according to a sentiment of the user reviews to identify negative user reviews and positive user reviews;
classifying the negative user reviews into a review type selected from a group of review types consisting of a functionality type of review of the application, a performance type of review of the application, and a usability type of review of the application;

tagging each of the negative user reviews with the review type;

plotting the negative user reviews as negative user review representations in an n-dimensional space, wherein the negative user review representations are plotted according to the sentiment of the user reviews, the review type, and a contextual content of the negative user reviews;

clustering top-k negative user review representations from the negative user review representations;

plotting a defect in the application as a defect representation in the n-dimensional space;

representing vectors from the defect representation to the top-k negative user review representations in the n-dimensional space, wherein the vectors represent a degree of overlap of contextual descriptors of the defect in the application and user complaints found in the negative user reviews;

determining Euclidian distances from the defect representation to the top-k negative user review representations in the n-dimensional space according to the vectors;

identifying the negative user review representations that are clustered within a predetermined distance from the defect representation according to the Euclidian distances; and prioritizing the defect in the application according to the negative user review representations that are clustered within the predetermined distance from the defect representation according to the Euclidian distances;

utilizing the representational model to predict a rating improvement to the application caused by changing the application to resolve user complaints represented by the top-k negative user review representations that are clustered within the predetermined distance from the defect representation according to the Euclidian distances, wherein changes that resolve user complaints that are represented by the top-k negative user review representations that are clustered within the predetermined distance from the defect representation according to the Euclidian distances are predicted to result in an improvement to future user reviews of the application than changes that are represented by negative user review representations that are plotted outside the predetermined distance from the defect representation according to the Euclidian distances;

based on the predicted rating improvement to the application, applying defect solutions that correct problems described in the top-k negative user review representations that are clustered within the predetermined distance from the defect representation according to the Euclidian distances to generate an improved version of the application; and installing the improved version of the application on the computing device to improve the functionality of the computing device.

9. The computer program product of claim 8, wherein the method further comprises:

prioritizing installation of the defect solutions according to the review type of the negative user reviews.

10. The computer program product of claim 8, wherein the method further comprises:

prioritizing installation of the defect solutions according to the sentiment of the user reviews.

11. The computer program product of claim 8, wherein the method further comprises:

computing defect criticalities of the defects according to a sentiment score, a rating, and a number of user reviews that address different defects in the application; and prioritizing the defect solutions according to the defect criticalities of the defects.

12. The computer program product of claim 8, wherein the method further comprises:

generating multiple improved versions of the application;

identifying an optimal improved version of the application that has a higher rating improvement than other improved versions of the application, wherein the optimal improved version of the application is selected from the multiple improved versions of the application; and installing the optimal improved version of the application before installing the other improved versions of the application on the computing device.

13. The computer program product of claim 12, wherein the method further comprises:

in response to installing the optimal improved version of the application before installing the other improved versions of the application on the computing device, retrieving new user reviews of the application, wherein the new user reviews comprise new ratings of the application;

in response to detecting an improvement in the new ratings of the application over the initial ratings of the application, applying the defect solutions that correct the problems described in the top-k negative user review representations that are clustered within the predetermined distance from the defect representation according to the Euclidian distances to a subsequent version of the application that is released after the optimal improved version of the application; and installing the subsequent version of the application on the computing device.

14. The computer program product of claim 12, wherein the method further comprises:

in response to installing the optimal improved version of the application before installing the other improved versions of the application on the computing device, retrieving new user reviews of the application, wherein the new user reviews comprise new ratings of the application;

in response to detecting a decline in the new ratings of the application over the initial ratings of the application, removing the defect solutions from a subsequent version of the application that is released after the optimal improved version of the application; and installing the subsequent version of the application on the computing device.

15. A computer system comprising:

a processor, a memory, and a non-transitory computer readable storage medium, wherein the processor loads instructions from the non-transitory computer readable storage medium onto the memory for execution by the processor to perform a method comprising:

creating a representational model of user reviews of an application by prioritizing defects in the application identified by the user reviews, wherein the representational model is trained and created exclusively with the user reviews of the application, and wherein the representational model is created by:
   receiving user reviews of the application, wherein the user reviews comprise initial ratings of the application;
   classifying the user reviews according to a sentiment of the user reviews to identify negative user reviews and positive user reviews;
   classifying the negative user reviews into a review type selected from a group of review types consisting of a functionality type of review of the application, a performance type of review of the application, and a usability type of review of the application;
   tagging each of the negative user reviews with the review type;
   plotting the negative user reviews as negative user review representations in an n-dimensional space, wherein the negative user review representations are plotted according to the sentiment of the user reviews, the review type, and a contextual content of the negative user reviews;
   clustering top-k negative user review representations from the negative user review representations;
   plotting a defect in the application as a defect representation in the n-dimensional space;
   representing vectors from the defect representation to the top-k negative user review representations in the n-dimensional space, wherein the vectors represent a degree of overlap of contextual descriptors of the defect in the application and user complaints found in the negative user reviews;
   determining Euclidian distances from the defect representation to the top-k negative user review representations in the n-dimensional space according to the vectors;
   identifying the negative user review representations that are clustered within a predetermined distance from the defect representation according to the Euclidian distances; and
   prioritizing the defect in the application according to the negative user review representations that are clustered within the predetermined distance from the defect representation according to the Euclidian distances;
utilizing the representational model to predict a rating improvement to the application caused by changing the application to resolve user complaints represented by the top-k negative user review representations that are clustered within the predetermined distance from the defect representation according to the Euclidian distances, wherein changes that resolve user complaints that are represented by the top-k negative user review representations that are clustered within the predetermined distance from the defect representation according to the Euclidian distances are predicted to result in an improvement to future user reviews of the application than changes that are represented by negative user review representations that are plotted outside the predetermined distance from the defect representation according to the Euclidian distances;

based on the predicted rating improvement to the application, applying defect solutions that correct problems described in the top-k negative user review representations that are clustered within the predetermined distance from the defect representation according to the Euclidian distances to generate an improved version of the application; and
installing the improved version of the application on the computing device to improve the functionality of the computing device.

16. The computer system of claim 15, wherein the method further comprises:
   prioritizing installation of the defect solutions according to the review type of the negative user reviews.

17. The computer system of claim 15, wherein the method further comprises:
   prioritizing installation of the defect solutions according to the sentiment of the user reviews.

18. The computer system of claim 15, wherein the method further comprises:
   computing defect criticalities of the defects according to a sentiment score, a rating, and a number of user reviews that address different defects in the application; and
   prioritizing the defect solutions according to the defect criticalities of the defects.

19. The computer system of claim 15, wherein the method further comprises:
   generating multiple improved versions of the application;
   identifying an optimal improved version of the application that has a higher rating improvement than other improved versions of the application, wherein the optimal improved version of the application is selected from the multiple improved versions of the application; and
   installing the optimal improved version of the application before installing the other improved versions of the application on the computing device.

20. The computer system of claim 19, wherein the method further comprises:
   in response to installing the optimal improved version of the application before installing the other improved versions of the application on the computing device, retrieving new user reviews of the application, wherein the new user reviews comprise new ratings of the application;
   in response to detecting an improvement in the new ratings of the application over the initial ratings of the application, applying the defect solutions that correct the problems described in the top-k negative user review representations that are clustered within the predetermined distance from the defect representation according to the Euclidian distances to a subsequent version of the application that is released after the optimal improved version of the application; and
   installing the subsequent version of the application on the computing device.

* * * * *